…

United States Patent Office 3,005,307
Patented Oct. 24, 1961

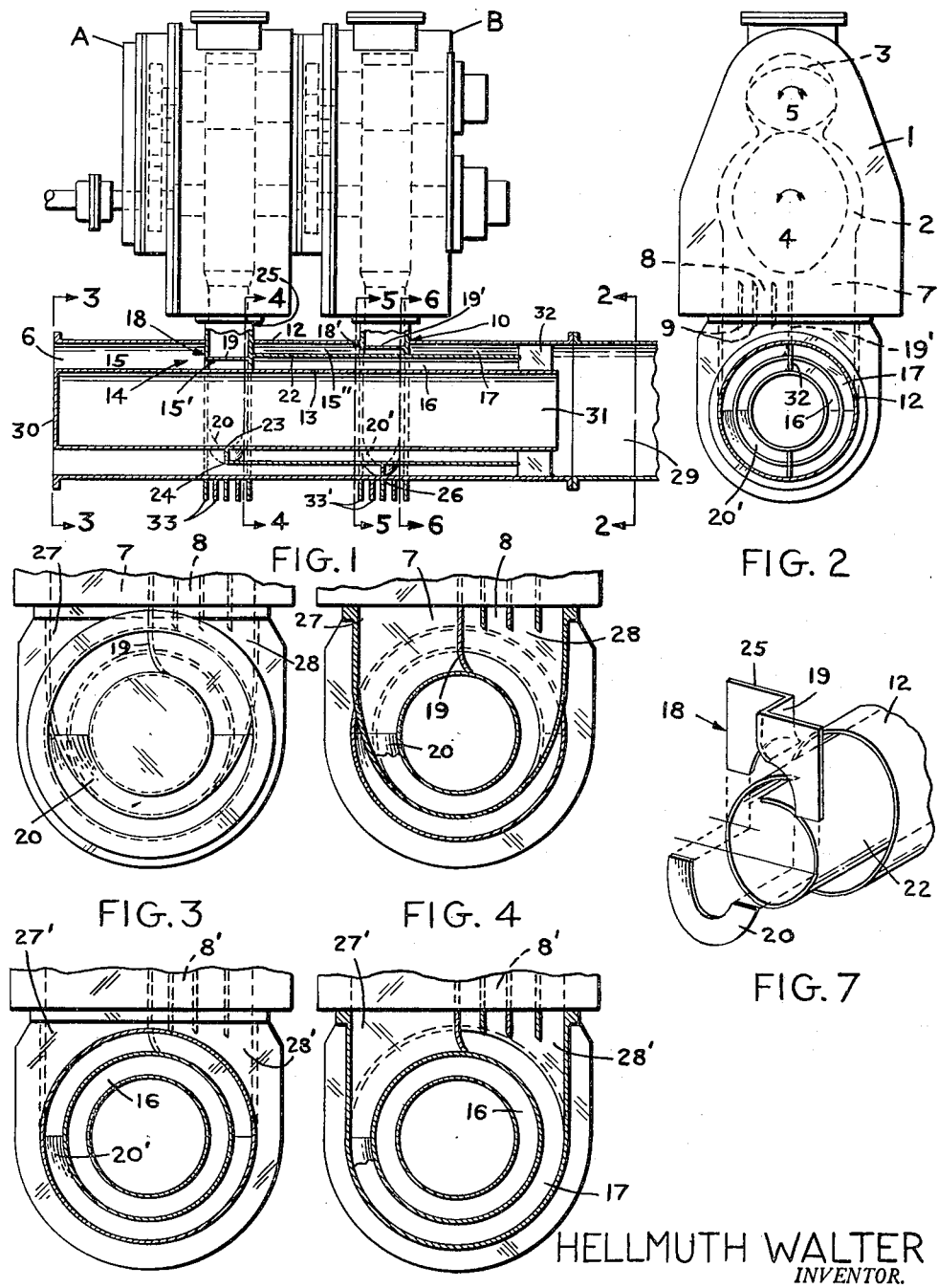

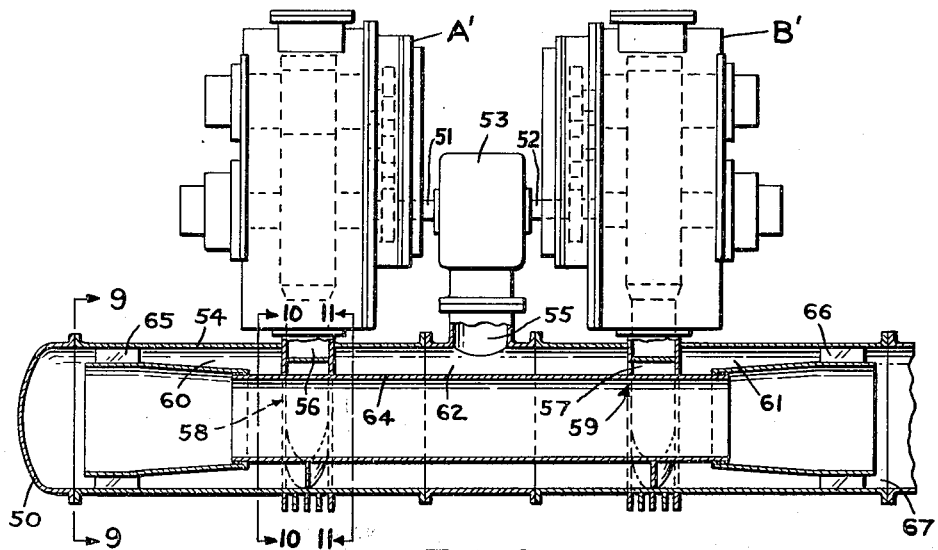
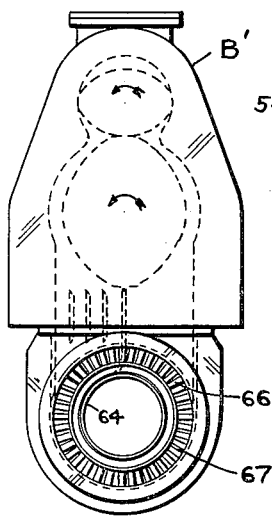
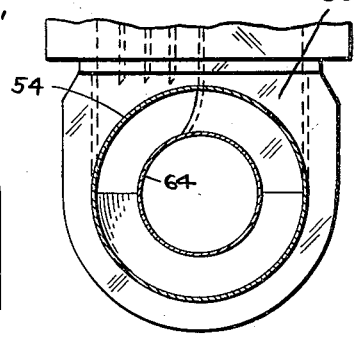
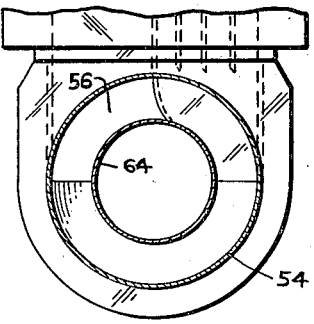
FIG. 8
FIG. 9
FIG. 10
FIG. 11
HELLMUTH WALTER
*INVENTOR.*

3,005,307
EXHAUST PULSE EQUALIZING ENERGY CONVERTERS FOR ROTARY COMBUSTION ENGINES
Hellmuth Walter, 181 Fernwood Ave.,
Upper Montclair, N.J.
Filed Jan. 20, 1959, Ser. No. 787,850
6 Claims. (Cl. 60—32)

This invention relates generally to rotary combustion engines and more particularly to the adaptation of the pulse equalizing energy converter, shown in my copending application Serial No. 540,481, filed October 14, 1955, now Patent 2,910,827, issued November 3, 1959, for use with at least two rotary engines to improve the operative efficiencies thereof.

As was discussed in the foregoing application, most types of rotary combustion engines, see for example my prior Patent 2,794,429, emit exhaust gases therefrom in the form of pulses.

Rather than expel these gases to a waste source and therefor lose the work-producing potential associated with them it is common in the art to apply the exhaust as working fluid for rotary machines, such as a gas turbine and the like.

However, in order to obtain optimum performance for machines that are driven by these exhaust gases it is preferable and desirable to provide the exhaust gases thereto with substantially uniform velocities and pressures.

The pulse equalizing energy converter in my above-mentioned copending application accomplishes the above requisites by teaching a means whereby exhaust gases are passed through a swirl chamber wherein the pulses are substantially lessened and accordingly there results working fluid of substantially uniform velocity and pressure.

While it is pointed out that the pulse equalizing energy converter provides the exhaust pulses with substantially uniform velocities and pressures it is not intended to infer that this is the only attribute associated therewith in its operative coaction with the rotary combustion engine. For example, the pulse equalizing energy converter also provides an ejector effect on the exhaust side of the engine to thereby assist in removing the exhaust gases in a convenient and efficient fashion and in such fashion that adds markedly to the operative efficiency of the rotary combustion engine.

Accordingly, it is evident from the foregoing generalized description of the rotary combustion engine, pulse equalizing energy converter combination that there is shown a compact power producing machine readily adapted to many of the applications presented to power producing machinery in the art.

At times, however, it is necessary to provide power, due to space limitations or power requirements and the like, through the application of two or more engines with their associated pulse equalizing energy converters. The present invention is directed to a power producing unit comprising at least two engines and at least two pulse equalizing energy converters which are arranged in a common housing which includes the necessary constituents, as will be pointed out in detail hereinafter, to provide the power producing unit comprising the engines and pulse equalizing energy converters with the pulse eliminating attribute and the other features pointed out in my above mentioned copending application and in addition provide a power producing unit that is extremely compact and will accordingly be applicable in a system confronted with space limitations.

With the foregoing objectives in view, and others as may appear in the accompanying specification, the invention consists of various features of construction and combination of parts, which will be first described in connection with the accompanying drawings, showing the compact power producing unit embodying the rotary combustion engines and the pulse equalizing energy converters, and the features of the invention will be specifically pointed out in the claims.

In the drawings:

FIGURE 1 is a side elevation partly in section showing two rotary combustion engines with one form of the combined pulse equalizing energy converter.

FIGURE 2 is an end view of the form of the invention shown in FIGURE 1 as seen from lines 2—2.

FIGURE 3 is an enlarged end view taken on line 3—3 of FIGURE 1.

FIGURE 4 is an enlarged cross section taken on line 4—4 of the embodiment shown in FIGURE 1.

FIGURE 5 is an enlarged cross sectional view taken on line 5—5 of FIGURE 1.

FIGURE 6 is an enlarged cross sectional view taken on line 6—6 of the embodiment shown in FIGURE 1.

FIGURE 7 is a fragmentary perspective view of the embodiment shown in FIGURE 1 showing one method of connecting the vessel separating the swirl chambers to the vanes and vane housing and showing the partition means in exploded form.

FIGURE 8 is a side elevation partly in section showing two rotary combustion engines with another form of combined exhaust pulse equalizing energy converter associated therewith.

FIGURE 9 is a cross section taken on line 9—9 of the embodiment shown in FIGURE 7.

FIGURE 10 is an enlarged cross sectional view taken on line 10—10 of the embodiment shown in FIGURE 7.

FIGURE 11 is an enlarged cross sectional view taken on line 11—11 of the embodiment shown in FIGURE 7.

Figure 12:
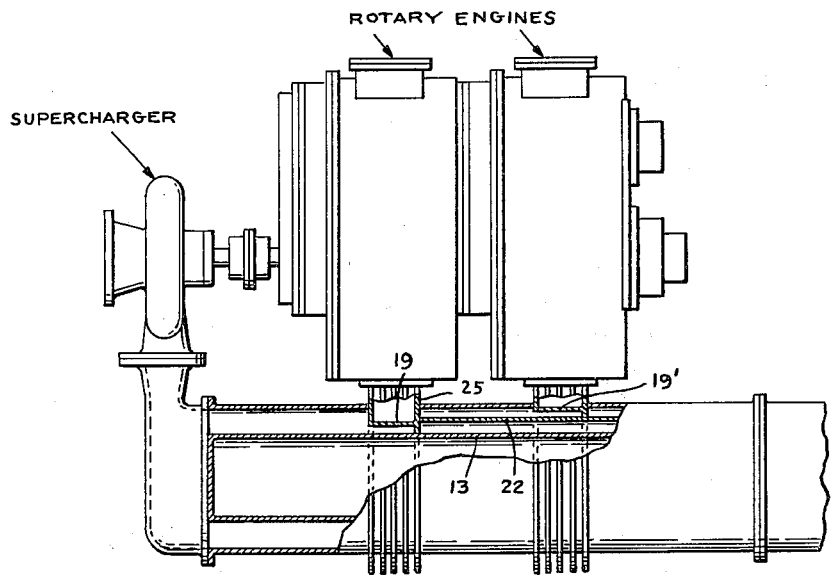
FIG 12 is a side elevation partly in section showing the unit of FIGURE 1 with a supercharger.
Figure 13:
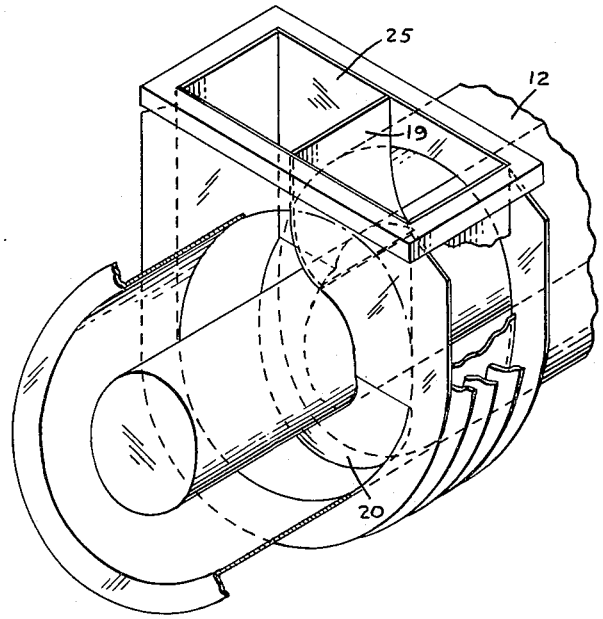
FIG. 13 is a perspective view partly in section of a portion of one of the exhaust pulse equalizers at its point of association with the rotary engine.

Referring to the drawings, FIGURE 1 shows one of the forms of the present invention, and as is the case with my copending application Serial No. 540,481, now Patent 2,910,827, it is not my intention to limit the operation of the power producing means which comprises, in this application, at least two engines preferably joined in coacting relation and their respective pulse equalizing energy converters to a system utilizing only oxidant gas referred to as fluid hereinafter delivered at atmospheric conditions. For example in FIGURE 8, I show a modified system utilizing a supercharged oxidant gas, referred to as fluid hereinafter, and further examples for obtaining optimum performance are generally stated in my prior Patent No. 2,794,429.

In addition to the foregoing, my prior Patent 2,794,429 describes the working features of the engines designated A and B in the drawings.

The rotary engines contemplated in this application preferably take the form of the engine shown in Patent 2,794,429, which engine generally comprises a block or housing 1 having a working chamber 2 and a small or combustion chamber 3 in which are rotatably mounted a respective working lobe 4 and a combustion lobe 5. The main chamber 2 communicates with the small or combustion chamber 3, and at a point remote from this point of communication has an opening with a partition 19 therein which forms an inlet 7 and an exhaust outlet 8 adjacent each other.

In operation, the rotary engine is initially turned over by compressed air or a small prime mover (not shown). Portions of an oxidant gas, usually air, are charged through the inlet 7 into one side of the main chamber where each portion is picked up and compressed by rotation of and coaction between the main lobe 4 and the combustion lobe 5 into a combustion space formed in the combustion chamber 3 each time that the combustion lobe 5 reaches the position indicated in FIGURE 2 of the drawings.

If fuel is now fed to each charge of fluid and combustion effected as by a spark or other suitable means of ignition, the expansion of the combustion gases deliver power to the respective lobes causing them to rotate and at the same time allows the gas to expand through the main chamber 2 on the side of the chamber opposite from the initial air charging side, whence the cycle is completed by the combustion gases exhausting through the exhaust outlet 8. This cycle repeats itself, the exhaust gases thus exhausting impulses from the exhaust outlet 8, the description and operation of the rotary internal combustion engine illustrated herein being more fully treated in my above mentioned Patent 2,794,429.

The partition 19' is so disposed with respect to the end of the main lobe 4 that the inlet 7 and exhaust 8 are in substantially continuous communication with each other. Hence, during the exhausting portion of one cycle and the charging portion of the succeeding cycle by reason of the adjacent relationship of the inlet 7 and exhaust outlet 8 and their communication with each other, an ejector action occurs which assists incoming fluid to charge the engine and simultaneously to mix and cool the exhausting gases. The vanes 9 in the exhaust outlet also act to assist in this ejector action.

As was indicated in my copending application, Serial No. 540,481, now Patent No. 2,910,827, the addition of the pulse equalizing energy converter to the rotary engines will amplify the ejector effect by increasing the differential pressure which exists between the inlet 7 and exhaust outlet 8 at predetermined periods and thus effectively provide means for charging the engine for efficient operation at atmospheric conditions.

As was indicated hereinabove, the power producing means contemplated herein includes many of the features of my above-mentioned patent applications and in addition contemplates a construction for the pulse equalizing energy converter that is particularly adapted for operation with at least two rotary combustion engines.

Accordingly, the exhaust pulse equalizing energy converters generally designated 10 for application with at least two rotary engines A and B shown as coupled at their main drive shafts as at 11 in coacting relation comprises a common housing 12 having the engines A and B mounted thereon to receive fluid therefrom and pass exhaust gases thereto as is described hereinafter and including a vessel 13 mounted therein and preferably to provide an annular space 14 therebetween. This of course is most readily accomplished through the concentric arrangement of the vessel 13 in the housing 12.

A portion of the annular space 15 provides a fluid inlet chamber 15' which communicates with the charging fluid inlet opening 6 in the housing 12 at one end and respectively with each engine A and B through their respective inlets 7 and 7'.

The other portion of the housing includes a first and second swirl chamber 16 and 17, referred to as swirl means for convenience, segregated from the fluid inlet chamber portion 15 by a first and second partition means 18 and 18'.

The first partition 18 formed in housing 12 resembles the partition shown in FIGURE 3 of my application Serial No. 540,481, now Patent No. 2,910,827, and is clearly shown in FIGURE 7 of the drawings, shown as including a portion of the partition 19 which extends therein to form a radial vane and a helically extending vane 20 mounted as hereinafter described in the housing 12 and about the inner vessel 13.

The radial vane portion of the partition 19 and helically extending vane 20 coacting to separate the inlet fluid from the exhaust gases of the engine with which they are associated and in addition the helical vane 20 imparts a swirl motion to the exhaust gases expelled from the engine and passed into the swirl means as hereinafter described. As is the case in the above copending application inlet fluid may be supplied in various forms and it is not intended to limit the operation of the unit therein described to one receiving fluid from an opening such as port 6 in the pulse equalizing energy converter housing.

The portion of the partition 19 extending into the pulse equalizer is disposed in a common plane with the axial line of said pulse equalizing energy converter and coacts with the helical vane 20 to separate the inlet fluid from the exhaust gases passing out of the engine with which the partition is associated.

The helically extending vane 20 is connected at one end to one side of the vessel 22 which is inserted about vessel 13 to divide the swirl means as described hereinafter and at the other end to the opposite side of the vessel 13. The inner helix of the vane 20 is preferably connected as at 23 to the outer circumference of the inner vessel 13 and the outer helix as at 24 to the inner periphery of the vessel 22.

The portion of partition 19, forming the radially extending vane, and the helically extending vane 20, of the partition means 18, divide a portion of the annular space 14 into a fluid inlet chamber 15' and a swirl means 16 for its respective engine. Said another way, the first partition means separates the inlet fluid entering the housing from the exhaust gases passing out of the engine with which it is associated.

Swirl means 16 and 17 in a portion of the annular space 14 are divided into independent entities by vessel 22 which is shown as concentrically mounted in the space 14 and in connected abutment with the first partition means housing 25 at the upper portion thereof and attached to the helical vane 20, in the lower portion thereof as is clearly shown in FIGURE 7 of the drawings.

The second partition means for separating the fluid inlet chamber 15" from the swirl means 17 resembles the form of the partition described above except that the helical vane 20' is mounted at its inner edge to the vessel 22 rather than the vessel 13 and is joined at the outer edge to the housing 12 as shown at 26 instead of to the vessel 22.

As with the first partition the helical vane 20' and radial vane of the partition 19' function to separate the fluid inlet chamber 15" from the swirl means 17 which results in the separation of the fluid entering the engine from the exhaust.

With the above described construction the pulse equalizing energy converter is adapted to accomplish the objectives set forth in my copending case and in a compact arrangement efficiently adapted to function with at least two engines.

The portion 15' of the fluid inlet chamber 15 communicates with engine A through inlet 7 and the portion 15" of the fluid inlet chamber 15 communicates with engine B through inlet 7'. Both portions communicating respectively with the separate engines through connecting means shown as ports 27 and 27' in the housing 12 so that inlet fluid may be freely admitted to the compression space in the main chambers during each combustion cycle. The swirl chambers 16 and 17 similarly communicate at one end through means shown as ports 28 and 28' in the housing 12 with the exhaust outlets 8 and 8' of the engine A and B and at the other end is provided a discharge outlet for the exhaust generally designated 29 and clearly shown in FIGURE 1.

As will be readily understood by one skilled in this art both the inlet and exhaust may be formed on the same side of the housing 12 when desired by closing the discharge opening 29 with a closure 50 as is shown in FIGURE 8 and opening the wall 30 of the inner vessel 13 whereby exhaust will then flow through the inner chamber 31 of vessel 13.

The length of the swirl means is as was indicated in my copending application, also tuned to roduce the maximum energy conversion when the gases are passed through the diffuser element 32 preferably mounted to act on the exhaust passing through both of the swirl means. While the diffuser means 32 is shown as mounted on the vessel 13 and in abutment with the wall of the housing 12 it is not intended to limit the construction to the form shown as other means may be utilized for converting the velocity energy of the exhaust gases to pressure energy, for example, those shown in my copending application Serial No. 540,481, now Patent No. 2,910,827.

This hereinabove preselection of the length of the swirl means is, of course, generally done empirically because there are many variables which can affect the desired conditions of the exhaust gases. For example, the temperature effect caused by the spilled air admitted with the exhausting gases into the equalizing energy converters; the effect on the pulses of exhausting gases produced by variations in the pressure of the admitted charging air; the effect on the pulses produced by the internal compression ratio of the rotary engines; and the expansion point established by the timing of the opening of the exhaust outlets for the rotary combustion engines are some of these variables. As a general rule, however, it has been found that the length is a function of the relative size of the mean cross-sectional area of the swirl chambers 16 and 17.

In operation, the engines A and B are started up as described above—inlet fluid is continuously delivered through opening 6. The fluid may be around atmospheric pressure or at super-atmospheric pressure as is desired, it being obvious that if working fluid is delivered at super-atmospheric pressure that it will act to supercharge the engine and increase its performance as in the case of other internal combustion engines.

The fluid enters the fluid inlet chamber 15 and a portion flows into the inlet 7 of the engine A through port 27. The other portion continues along the other portion of inlet chamber 15″ to enter engine B through inlet 7′ which communicates with port 27′. The fluid thus passed to the engine is passed through successive combustion cycles as above described.

The exhausting gases of engine A expand in pulses through the exhaust outlet 8′ into the swirl means 16 through exhaust port 28 and the exhausting gases of engine B similarly pass through exhaust outlet 8′ into swirl means 17 through port 28′. As will be understood in the art, the velocity of the exhaust gases leaving the engine vary periodically during each cycle within wide limits which is due to the changing pressure in the expansion space of the engine during the discharge period of the cycle.

In addition, and as was the case in my copending application No. 540,481, now Patent No. 2,910,827, as the exhaust gases at high velocity pass the vanes 9 and the partition 19 an ejector effect is originated and as has been hereinabove described, if the working lobes are in the beginning portion of the succeeding combustion cycle, entering fluid will be drawn into the exhaust outlets 8 and 8′ with the exhaust gases whence it also passes to the outlet connecting ports 28 and 28′.

The mixing of the expanding combustion gases with intake fluid will act to cool the combustion gases so that the converters and portions coming into contact with the exhaust gases will not be adversely affected by the usually extreme temperatures.

A plurality of structural support fins 33 and 33′ are provided about the housing as is shown in FIGURE 1 of the drawings to strengthen the converter and act as heat transfer elements to aid in keeping the pulse equalizing energy converters at reasonable temperatures.

From the connecting ports 28 and 28′ the pulses of combustion gases and intake air are passed to the swirl chambers 16 and 17 tangentially by reason of the offset position of the passages 28 and 28′ and the helical vanes 20 and 20′.

And as was the case in my abovementioned copending application, in the swirl chambers the combustion gases and air are thoroughly mixed and caused to flow or follow a path in the form of a vortex in which the circumferential velocity is relatively high as compared to the axial movement of the gases as they travel towards the outlet. Of course, much of this axial movement is imparted to the swirling gases by the helical vanes 20 and 20′.

Thus, the combustion gases have been cooled by mixing with the intake air and the mixture has become a mass of rotating gas at substantially uniform average velocity constantly receiving pulses of the expanding combustion gases and intake air at one end and delivering the mixture of cooled gases at substantially uniform velocity, pressure and temperature at the opposite end and available for conversion to usable energy.

This foregoing conversion into usable energy may be accomplished as follows:

(1) The high velocity of the exhaust gases having passed through the swirl chamber and now of substantially uniform velocity and pressure can be partly converted into a gas stream of lower velocity and higher pressure; or (2) The kinetic energy of the gases can be used substantially unchanged in about the same ratio of pressure and velocity as it has passing through the swirl chambers for application in a gas turbine installation wherein kinetic energy is converted into mechanical energy.

One such conversion, and from velocity to pressure, is shown by way of example, and is accomplished by passing the mixture of gases advancing through the narrowed portions of the swirl chambers through the diffuser elements 32. As the gases enter the guiding and diffuser vanes 32 the peripheral component of the gas velocity will be changed into pressure so that the mean static pressure at the converter outlet 28 after the cascade of diffuser elements 32 is higher than the mean static pressure in the swirl chambers 16 and 17.

The form of the invention shown in FIGURE 8 differs in some degree from the form shown in FIGURES 1 to 7 but the principles of operation and the general principles of construction are similar.

This form of the invention shows the engines A′ and B′ arranged in face to face relationship so that the power output shafts 51 and 52 are contra-rotating to drive the contra-rotating blades of the supercharger 53. While this form shows the engines A′ and B′ as having their inlets on opposite sides of the axis of the housing 54 and as driving a supercharger of the well known contra-rotating type 53 it is not intended to limit this embodiment to this form as the engines may be arranged to drive the usual type turbo-blower and may be mounted on the equalizer in a variety of fashions all of which are well within the province of a skilled technician in the art.

Instead of separating the swirl chambers with a vessel as was the case with the embodiment shown in FIGURE 1; this modification teaches a central fluid inlet chamber 55 receiving fluid from the supercharger 53 from whence it passes to the engines A′ and B′ through ports 56 and 57.

As was the case with the embodiment shown in FIGURE 1, a first and second partition means 58 and 59 act to separate and divide the swirl chambers 60 and 61 from the fluid inlet chamber 62 which is formed between the common housing 54 and the vessel 64 mounted concentrically therein.

Diffuser means 65 and 66 of the type mentioned hereinabove are also mounted in the swirl chambers 60 and 61 and in a relationship to receive the gases passed through the swirl means and change the high velocities to usable pressure in a fashion as above described.

The exhaust passing through swirl means 61 discharging through opening 67 for use in any intended application and the exhaust passing through swirl means 60 and vanes 65 being reversed by cover plate 50 to pass through the interior of vessel 64 to also discharge if desired for the same use as the gases passing out swirl means 61.

It is believed that because the operation and construction of the embodiment shown in FIGURE 8 are very much like that shown in FIGURE 1, that the construction and operation of this form is clearly understood from the above description.

Of course it will be evident to one skilled in the art that the engines and supercharger shown in FIGURE 7 can be readily adapted for operation with the pulse equalizing energy converter shown in FIGURE 1. The supercharger would be adapted to discharge into the inlet opening 6 to thereby provide a more compact arrangement for operation in an application having extremely limited space requirements.

It will be understood that the invention is not to be limited to the specific construction or arrangement of parts shown but that they may be widely modified within the invention defined by the claims.

What is claimed is:

1. At least two pulse equalizing energy converters for use with at least two rotary combustion engines each having fluid inlets and exhaust outlets for receiving and delivering respectively inlet fluid and exhaust gases from and to the pulse equalizing energy converters, said pulse equalizing energy converters having a common housing including a first vessel mounted concentrically within said common housing to form a first annular space therebetween, a second vessel disposed in a portion of said first annular space and in concentric relation with said housing to form a second annular space with said common housing and a third annular space with said first vessel, said common housing including a first set of openings comprising an inlet and exhaust port and a second set of openings comprising an inlet and exhaust port, the inlet port of said first set of openings providing communication between said first annular space and the inlet of one of said rotary combustion engines, the exhaust port of said first set of openings communicating the third annular space with the last mentioned engine, the inlet port of said second set of openings communicating the first annular space with said other rotary combustion engine through a portion of said second annular space, the exhaust port of said second set of openings communicating another portion of said second annular space with the exhaust of the last mentioned engine, air inlet means disposed in said first annular space to provide working air for said rotary combustion engines, a first and second helical partition disposed in said housing, and to divide said first annular space and the portion of said second annular space communicating with the inlets of the rotary combustion through the inlet ports of said first and second set of openings into an air inlet chamber, said first and second partitions and said second vessel coacting to divide the portion of said second annular space and said third annular space communicating with the exhaust of said rotary combustion engines through the exhaust ports of said first and second set of openings respectively into a first and second swirl chamber, said first helical partition and said second vessel being mounted in said housing and coacting to prevent direct flow of air from said first annular space to said second swirl chamber said second helical partition mounted in said housing and coacting with said second vessel to prevent direct flow of air from the first annular space to said first swirl chamber, both said helical partitions in spaced relation with each of the inlet and exhaust ports of both the first and second set of openings whereby side of said helical partition directs air flowing into said pulse equalizing energy converters into the inlet of one of said rotary combustion engines and the other side of said partition causes exhaust gases from the exhaust outlets of said engines to pass to the inlet of said swirl chamber in helical fashion, and said first and second swirl chambers being of a predetermined dimension to permit a blending together of the pulses of exhaust gases passed to the swirl chambers from the rotary combustion engines to provide a source of usable energy.

2. At least two pulse equalizing energy converters for use with at least two rotary combustion engines each having fluid inlets and exhaust outlets for receiving and delivering respectively inlet fluid and exhaust gases from and to the pulse equalizing energy converters, said pulse equalizing energy converters having a common housing including a first vessel mounted concentrically within said common housing to form a first annular space therebetween, a second vessel disposed in a portion of said first annular space and in concentric relation with said housing to form a second annular space with said common housing and a third annular space with said first vessel, said common housing including a first set of openings comprising an inlet and exhaust port and a second set of openings comprising an inlet and exhaust port, the inlet port of said first set of openings providing communication between said first annular space and the inlet of one of said rotary combustion engines, the exhaust port of said first set of openings communicating the third annular space with the last mentioned engine, the inlet port of said second set of openings communicating the first annular space with said other rotary combustion engine through a portion of said second annular space, the exhaust port of said second set of openings communicating another portion of said second annular space with the exhaust of the last mentioned engine, air inlet means disposes in said first annular space to provide working air for said rotary combustion engines, a first and second helical partition disposed in said housing, and to divide said first annular space and the portion of said second annular space communicating with the inlets of the rotary combustion through the inlet ports of said first and second set of openings into an air inlet chamber, said first and second partitions and said second vessel coacting to divide the portion of said second annular space and said third annular space communicating with the exhaust of said rotary combustion engines through the exhaust ports of said first and second set of openings respectively into a first and second swirl chamber, said first helical partition and said second vessel being mounted in said housing and coacting to prevent direct flow of air from the first annular space to said first swirl chamber, both said helical partitions in spaced relation with each of the inlet and exhaust ports of both the first and second set of openings whereby side of said helical partition directs air flowing into said pulse equalizing energy converters into the inlet of one of said rotary combustion engines and the other side of said partition causes exhaust gases from the exhaust outlets of said engines to pass to the inlet of said swirl chamber in helical fashion, said first and second swirl chambers being of a predetermined dimension to permit a blending together of the pulses of exhaust gases passed to the swirl chambers from the rotary combustion engines to provide a source of usable energy, and means connected to the ends of the swirl chambers to convert velocity energy of the gases in the swirl chamber to pressure energy.

3. The combination in claim 1 wherein said first and second swirl chambers are formed at one end of the pulse equalizing energy converter and said first and second swirl chambers being concentric with the common housing of said pulse equalizing energy converter.

4. The combination claimed in claim 1 wherein the engines coact to drive a supercharger mounted on the housing and said supercharger being in operative communication with the inlets of both engines to supply fluid thereto.

5. At least two pulse equalizing energy converters for use with at least two rotary combustion engines each having fluid inlets and exhaust outlets for receiving and delivering respectively inlet fluid and exhaust gases from and to the pulse equalizing energy converters, said pulse equalizing energy converters having a common housing and a vessel mounted concentrically within said housing to form an annular space therebetween, said common housing including a first set of openings comprising an inlet and exhaust port and a second set of openings comprising an inlet and exhaust port, port means on the housing and between said rotary combustion engines, a supercharger connected to the port means and driven by both engines to supply pressurized working fluid to the inlets of the first and second set of openings, the inlet port of said first set of openings communicating a portion of said annular space with the inlet of one of said rotary combustion engines and the exhaust port of said first set of openings operating to communicate another portion of said annular space with the exhaust of said last mentioned rotary combustion engine, the inlet port of said second set of openings operating to communicate a portion of said annular space with the inlet of the other rotary combustion engine and the exhaust port of said second set of openings operating to communicate another portion of said annular space with the exhaust of the last mentioned rotary combustion engine, a first and second helical partition disposed in said housing and to divide respectively in the portion of said annular space communicating with the inlets of said rotary combustion engines through the inlet ports of said first and second set of openings into an air inlet chamber and the portion of said space for communication with the exhausts of said rotary combustion engines through the exhaust ports of said first and second set of openings into a swirl chamber, said swirl chambers being formed at opposite ends of said housing, each of said helical partitions disposed in said annular space being positioned therein to prevent direct flow of air passing into the air inlet chamber to said swirl chamber and said helical partition in spaced relation with each of the inlet and exhaust ports of both the first and second set of openings whereby one side of said helical partition directs air flowing into said air inlet chamber into the inlet of one of said rotary combustion engines and the other side of said partition causes exhaust gases from the exhaust outlets of said engines to pass to the inlet of said swirl chamber in a helical fashion, the swirl chambers formed at opposite ends of the housing being of a predetermined dimension to permit a blending together of the pulses of exhaust gases passed to said swirl chambers from the rotary combustion engines to provide a source of usable energy, and a closure mounted on one of the ends of the housing whereby exhaust passing through the swirl chamber adjacent the last mentioned end is turned to pass through said vessel mounted concentrically within the housing.

6. The combination claimed in claim 5 including diffuser means connected to the housing and in the path of said exhaust gases for converting a part of the velocity energy of the exhaust gases to pressure energy.

References Cited in the file of this patent

UNITED STATES PATENTS

| | | |
|---|---|---|
| 1,417,804 | Davies | May 30, 1922 |
| 2,173,550 | Coanda | Sept. 19, 1939 |
| 2,387,707 | Wolley | Oct. 23, 1945 |
| 2,910,827 | Walter | Nov. 3, 1959 |